US010013289B2

(12) United States Patent
Kung et al.

(10) Patent No.: US 10,013,289 B2
(45) Date of Patent: Jul. 3, 2018

(54) PERFORMING AUTOMATIC MAP REDUCE JOB OPTIMIZATION USING A RESOURCE SUPPLY-DEMAND BASED APPROACH

(71) Applicant: International Business Machines Corporation, Armonk, NY (US)

(72) Inventors: David S. Kung, Westchester, NY (US); Dung Phan, Ossinig, NY (US); Jinjun Xiong, Golden Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 15/140,830

(22) Filed: Apr. 28, 2016

(65) Prior Publication Data
US 2017/0315848 A1 Nov. 2, 2017

(51) Int. Cl.
G06F 9/46 (2006.01)
G06F 9/50 (2006.01)

(52) U.S. Cl.
CPC ................... *G06F 9/5055* (2013.01)

(58) Field of Classification Search
None
See application file for complete search history.

(56) References Cited

U.S. PATENT DOCUMENTS 9,152,469 B2  10/2015  Cherkasova et al.

| | | | |
|---|---|---|---|
| 2011/0258246 A1* | 10/2011 | Khandekar | G06F 9/5027 709/201 |
| 2013/0144451 A1* | 6/2013 | Kumar | G05B 13/02 700/291 |
| 2013/0246032 A1* | 9/2013 | El-Bakry | E21B 41/00 703/10 |

(Continued)

FOREIGN PATENT DOCUMENTS

WO    2015066979 A1    5/2015

OTHER PUBLICATIONS

Huan Ke, Peng Li, Song Guo, Minyi Guo, On Traffic-Aware Partition and Aggregation in MapReduce for Big Data Applications, Mar. 2016, IEEE.*

(Continued)

*Primary Examiner* — Dong Kim
(74) *Attorney, Agent, or Firm* — Scully, Scott, Murphy & Presser, P.C.; Daniel P. Morris, Esq.

(57) ABSTRACT

Determining optimum values for Map Reduce parameters by identifying parameters that affect performance of a Map Reduce job, determining a relationship between each of the identified parameters and a maximization of resource utilization for a plurality of computing resources configured for executing the Map Reduce job, representing a workflow based upon supply-demand relationships among the plurality of computing resources, modeling an execution cost as a function of the plurality of identified parameters, formulating a non-linear programming problem to minimize the execution cost, reformulating the non-linear programming problem as a linear programming problem, and solving the linear programming problem to determine a combination of parameter values for the plurality of identified parameters that minimizes the execution cost for the Map Reduce job.

18 Claims, 7 Drawing Sheets

(56) References Cited

U.S. PATENT DOCUMENTS

| | | |
|---|---|---|
| 2013/0254196 A1* | 9/2013 | Babu .................. G06F 17/30595 707/736 |
| 2013/0339972 A1 | 12/2013 | Zhang et al. |
| 2014/0040855 A1* | 2/2014 | Wang .................... G06F 9/4436 717/107 |
| 2014/0059310 A1* | 2/2014 | Du ........................... G06F 3/065 711/162 |
| 2014/0122546 A1* | 5/2014 | Liao .................. G06F 17/30306 707/827 |
| 2014/0137104 A1* | 5/2014 | Nelson ................ G06F 9/45558 718/1 |
| 2014/0201753 A1* | 7/2014 | He ........................ G06F 9/4881 718/104 |
| 2014/0266041 A1* | 9/2014 | Ghosh ................. B60L 11/1846 320/109 |
| 2015/0150011 A1 | 5/2015 | Fischetti et al. |
| 2015/0227393 A1 | 8/2015 | Fuller et al. |
| 2015/0269001 A1 | 9/2015 | Balmin et al. |
| 2015/0277980 A1 | 10/2015 | Ovsiankin et al. |

OTHER PUBLICATIONS

Xu et al.; Ttl: Resource optimization for speculative execution in a MapReduce Cluster; Publication Ttl: 2013 21st IEEE International Conference on Network Protocols (ICNP); 2013; Publisher: IEEE; Country of Publication: USA; ISBN: 9781479912704; Database: INSPEC.

* cited by examiner

PERFORMING AUTOMATIC MAP REDUCE JOB OPTIMIZATION USING A RESOURCE SUPPLY-DEMAND BASED APPROACH

FIELD

The present application relates generally to computer software and, more particularly, to job optimization in a distributed computing environment.

BACKGROUND

Interconnected global computing systems are generating an enormous amount of irregular, unstructured data. Mining such data for actionable business intelligence can provide an enterprise with a significant competitive advantage. High-productivity programming models that enable programmers to write small pieces of sequential code to analyze massive amounts of data are particularly valuable in mining this data.

Over the last several years, Apache™ Hadoop™ has emerged as an important programming model for processing large data sets. More specifically, Hadoop™ is an open-source, Java™-based software framework that supports the processing of large data sets in a distributed computing environment. Hadoop™ provides for distributed processing of large datasets across clusters of computers using a simple programming model. Hadoop™ can scale up from single servers to thousands of machines, each machine offering local computation and storage.

Hadoop™ includes a storage portion, known as Hadoop Distributed File System (HDFS), and a processing portion called Map Reduce. Map Reduce is a programming model and associated implementation for processing parallelizable problems across large data sets using a large number of computers (nodes). If all nodes are on the same local network and use similar hardware, then these nodes are collectively referred to as a cluster. If the nodes are shared across geographically and administratively distributed systems, and use heterogenous hardware, these nodes are collectively referred to as a grid. Processing can occur on data stored in a file system (unstructured), or on data stored in a database (structured), or on data stored in any combination of file systems and databases.

Hadoop™ splits files into large blocks and distributes them across nodes in a cluster. In response to receiving a data set that is to be processed, Hadoop™ transfers packaged code for each of a plurality of nodes to perform parallel processing of the data set. Map Reduce can take advantage of the locality of data, processing the data in proximity to the place it is stored in order to reduce the distance over which the data must be transmitted. This data locality allows data sets to be processed faster and more efficiently than would be the case in a more conventional supercomputer architecture that relies on a parallel file system where computation and data are distributed via high-speed networking.

Map Reduce includes a plurality of mappers for performing filtering and sorting, a plurality of reducers for performing one or more summary operations, and a Map Reduce framework. The mappers and reducers may be implemented using programmer-supplied code. Map Reduce processes a programming problem by specifying one or more mappers for performing each of a plurality of Map operations, as well as one or more reducers for performing each of a plurality of reduce operations. Each of the mappers is configured for receiving a small chunk of data (typically in the form of pairs of (key,value)), and producing a mapper output in the form of zero or more additional key value pairs. Multiple mappers are executed in parallel on all the available data, resulting in a large collection of (key,value) pairs. These pairs are then sorted and shuffled. Moving the mapper outputs to the reducers is referred to as shuffling. The reducer is used to reduce the set of values associated with a given key. Multiple reducers operate in parallel, one for each generated key.

The key value pairs may be retrieved from, and written to, a distributed, resilient file system such as HDFS. A partitioned input key/value (KV) sequence I is operated on by mappers to produce another KV sequence J, which is then sorted and grouped ("shuffled") into a sequence of pairs of key/list of values. The list of values for each key is then operated upon by a reducer which may contribute zero or more KV pairs to the output sequence. If the involved data sets are large, they are automatically partitioned across multiple nodes and the operations are applied in parallel.

An illustrative example of a Map operation sorts college students by first name into a plurality of queues. Each of respective first names is assigned to a corresponding queue. An illustrative example of a Reduce operation counts the number of college students in each queue, yielding name frequencies for each of the respective first names. The Map Reduce framework (also referred to herein as a Map Reduce infrastructure or a Map Reduce system) orchestrates parallel processing by marshalling distributed servers, running each of a plurality of tasks in parallel, managing all communication and data transfers between various parts of the system, and providing for redundancy and fault tolerance.

Many software applications exist that are configured for implementing Map Reduce by provide programming or software framework or application programming interfaces for allowing users to program the aforementioned Map Reduce functionality. Though it is common to implement Map Reduce using Java™ code, any programming language can be used in conjunction with Hadoop™ to implement a map to reduce parts of a user program.

The Map Reduce model is a popular choice for implementing big data analytics. Performing timely and cost-effective analytics with "Big Data" is a key ingredient for success in many business, scientific and engineering endeavors. Execution time for any Map Reduce job run is dependent on more than seventy user-configurable parameters. If these parameters are set inappropriately, a significant decrease in performance may be observed. If the user does not specify parameter settings during job submission, then default values—shipped with the model or specified by a system administrator—are used. Good settings for these parameters depend on job, data, and cluster characteristics. Users often run into performance problems caused by lack of knowledge of these parameters. Many practitioners of big data analytics—including computational scientists, systems researchers, and business analysts—would like to use a system that can tune itself and provide good performance automatically. Unfortunately, the "out of the box" performance of Hadoop™ leaves much to be desired, leading to suboptimal use of resources, time, and money. Many users lack the necessary expertise and inclination to tune the MapReduce parameters to obtain an acceptable level of performance.

MapReduce job performance tuning has become an important topic for researchers to explore. Several approaches have been formulated for automatically determining values for a plurality of Map Reduce parameters. These approaches use dynamic tuning, static tuning, or various combinations of static and dynamic tuning. Dynamic tuning requires instrumenting and modifying Hadoop™ source codes to collect dynamic run-time statistics. These statistics are then used to build a performance model for guiding performance tuning.

Starfish has been proposed as a self-tuning tool for improving MapReduce job performance through a combination of static and dynamic program analysis. A cost-based optimization approach is utilized. Starfish operates in two phases: first, profiling a standard workload to gather information; and, second, analyzing the profile to create a set of optimized parameters and executing the result as a new workload. The goal of Starfish is not to achieve the maximum level of peak performance that would be obtainable in the context of a manually-tuned system. Regular Starfish users may rarely see performance close to this peak. Rather, the goal of Starfish is to enable Hadoop™ users and applications to obtain acceptable performance automatically throughout a data lifecycle, without any need for the user to understand and manipulate the many tuning knobs available.

Starfish-based optimization methods are time-consuming and not cost-effective. In an effort to overcome the shortcomings of Starfish, an MRONLINE model has been developed to support online performance tuning through designing an efficient hill climbing algorithm. This algorithm provides a real-time performance monitor and a dynamic configuration. Unfortunately, dynamic tuning models such as Starfish and MRONLINE require users to understand the specific internal workings of an application and customize the tuning based on these specifics. This level of understanding and customization is impossible in many cases. Moreover, it is necessary for the user to collect various statistics for numerous runs from a set of runtime log files. The process of collecting these statistics can be very laborious and time consuming.

Static tuning models capture relationships between tunable parameters and execution characteristics. One illustrative example of a static tuning model is MRTuner which uses a Producer-Transporter-Consumer (PTC) cost model to characterize one or more tradeoffs in Map Reduce parallel execution. While formulating a Map Reduce job execution plan in accordance with the PTC model, it is necessary to ensure that a generation of Map outputs by the Producer, a transportation of Map outputs by the Transporter, and a consumption of Map outputs by the Consumer, all keep pace with one another. MRTuner provides this functionality by using a Catalog Manager (CM) and a Job Optimizer (JBO). The CM is configured for building and managing a catalog for historical jobs, data, and system resources. Statistics in the catalog are collected by a job profiler, a data profiler and a system profiler. To optimize a new Map Reduce job, the JBO calls the CM to find a previous job profile in the catalog that is most similar to the new Map Reduce job to be optimized, as well as related data and system information for the most similar job. Based upon the related data and system information, an estimation process is performed to generate a profile and a plurality of potential execution plans for the new Map Reduce job. Then, the JBO estimates the running time of potential execution plans to identify an optimal execution plan.

Static tuning models such as MRTuner consider execution characteristics. An optimal execution plan is formulated by identifying a similar job profile from the catalog. However, static tuning models such as MRTuner do not consider supply-demand relationships based on resource availability. No mechanism is provided for formalizing resource based supply-demand relations and then performing optimization with default constraints on the parameters.

SUMMARY

The following summary is merely intended to be exemplary. The summary is not intended to limit the scope of the claims.

A method for automatically determining values for a plurality of Map Reduce parameters, in one aspect, may comprise identifying a plurality of parameters that affect performance of a Map Reduce job, determining a relationship between each of the identified parameters and a maximization of resource utilization for a plurality of computing resources configured for executing the Map Reduce job, representing a workflow for the Map Reduce job based upon one or more supply-demand relationships among the plurality of computing resources, modeling an execution cost for the Map Reduce job as a function of the plurality of identified parameters, formulating a non-linear programming problem to minimize the execution cost for the Map Reduce job, reformulating the non-linear programming problem as a linear programming problem, and solving the linear programming problem to determine a combination of parameter values for the plurality of identified parameters that minimizes the execution cost for the Map Reduce job.

A computer program product for automatically determining values for a plurality of Map Reduce parameters, in another aspect, may comprise a computer-readable storage medium having a computer-readable program stored therein, wherein the computer-readable program, when executed on a computer, causes the computer to identify a plurality of parameters that affect performance of a Map Reduce job, determine a relationship between each of the identified parameters and a maximization of resource utilization for a plurality of computing resources configured for executing the Map Reduce job, represent a workflow for the Map Reduce job based upon one or more supply-demand relationships among the plurality of computing resources, model an execution cost for the Map Reduce job as a function of the plurality of identified parameters, formulate a non-linear programming problem to minimize the execution cost for the Map Reduce job, reformulate the non-linear programming problem as a linear programming problem, and solve the linear programming problem to determine a combination of parameter values for the plurality of identified parameters that minimizes the execution cost for the Map Reduce job.

An apparatus for automatically determining values for a plurality of Map Reduce parameters, in another aspect, may comprise a processor and a memory coupled to the processor, wherein the memory comprises instructions which, when executed by the processor, cause the processor to identify a plurality of parameters that affect performance of a Map Reduce job, determine a relationship between each of the identified parameters and a maximization of resource utilization for a plurality of computing resources configured for executing the Map Reduce job, represent a workflow for the Map Reduce job based upon one or more supply-demand relationships among the plurality of computing resources, model an execution cost for the Map Reduce job as a function of the plurality of identified parameters, formulate a non-linear programming problem to minimize the execution cost for the Map Reduce job, reformulate the non-linear programming problem as a linear programming problem, and solve the linear programming problem to determine a combination of parameter values for the plurality of identified parameters that minimizes the execution cost for the Map Reduce job.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

The explosive growth in data volume brings about many challenges, such as efficient big data management. A Map Reduce programming model enables utilization of millions of individual computing units to concurrently perform large-scale computing, while Apache Hadoop™ provides a reliable, scalable and distributed computing platform for using MapReduce to process big data related problems. These factors enables MapReduce based computing solutions to be increasingly deployed in the context of industry, research, Internet searching, finance, business informatics, and genomics.

The present disclosure relates to improving Map Reduce job performance by reducing system latency and maximizing the utilization of computing resources. The Hadoop™ programming model provides a fully configurable environment where the values of more than seventy parameters can be tuned to improve Map Reduce job performance, leading to a challenge in selecting optimal values for these parameters.

Figure 1:
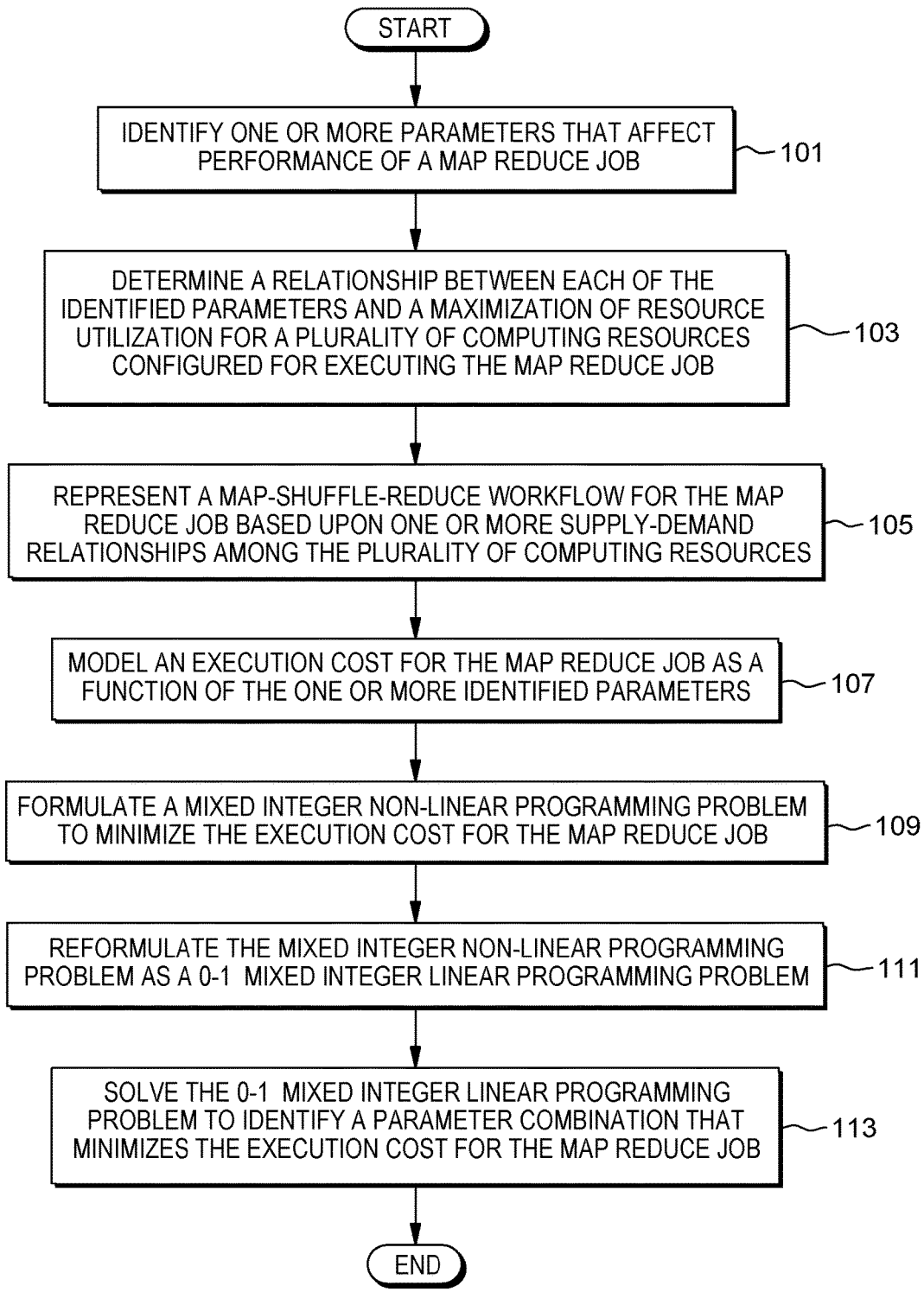
FIG. 1 illustrates an exemplary method of automatically determining values for a plurality of Map Reduce parameters.

FIG. 1 illustrates an exemplary method of automatically determining values for a plurality of Map Reduce parameters. A parameter tuning method is provided by using a systematic method to solve an optimization problem. The method commences at block 101 where a plurality of parameters that affect performance of a Map Reduce job are identified. For example, an in-depth analysis may be conducted to discover one or more factors that are key, important, critical, or instrumental to the performance of the Map Reduce job. Next, at block 103, a relationship is determined between each of the identified parameters and a maximization of resource utilization for a plurality of computing resources configured for executing the Map Reduce job. Resource utilization maximization is used to improve job performance, and to provide a solution that is generally applicable to a wide range of Map Reduce jobs.

The operational sequence of FIG. 1 advances to block 105 where a map-shuffle-reduce workflow for the Map Reduce job is represented based upon one or more supply-demand relationships among the plurality of computing resources. An execution cost for the Map Reduce job is modeled mathematically as a function of the plurality of identified parameters (block 107). This mathematical model may incorporate one or more operational constraints based upon one or more interactions specified by the map-shuffle-reduce workflow. A mixed-integer non-linear programming problem is formulated to minimize the execution cost for the Map Reduce job (block 109).

The mixed-integer non-linear programming problem is reformulated as a 0-1 mixed integer linear programming problem at block 111. Basically, 0-1 linear programming involves problems in which the variables are restricted to be either 0 or 1. Note that any bounded integer variable can be expressed as a combination of binary variables. For example, given an integer variable, $0 \leq x \leq U$, the variable can be expressed using $[\log_2 U]+1$ binary variables:

$$x = x_1 + 2x_2 + 4x_3 + \ldots + 2^{[\log_2 U]} x_{[\log_2 U]+1}.$$

At block 113, the 0-1 mixed integer linear programming problem is solved to determine a combination of parameter values for the plurality of identified parameters that minimizes the execution cost for the Map Reduce job. As will be described in greater detail hereinafter, simulations running on a 10-node cluster demonstrate that the procedure of FIG. 1 significantly outperforms implementations of Hadoop™ that use default parameter settings.

The procedure of FIG. 1 provides a method that reduces execution time by maximizing the utilization of computing resources in a cluster. The optimal tuning parameters are determined once for a given cluster. These tuning parameters are then applicable to one or more subsequent Map Reduce jobs that are executed by that cluster. By comparison, existing methods determine a new set of tuning parameters every time a new Map Reduce job is executed. Instead of modeling job execution time explicitly (which will make parameter optimization job-dependent), the procedure of FIG. 1 models cluster resource utilization as an indirect measure for execution time. This model captures complex operations and their interactions and constraints as shown in FIG. 2, such as shuffle, Mapper 212, 214, 216, and Reducer 222, 224, and 226 operations, through a set of parametrized mathematical models.

The method of FIG. 1 may be utilized to improve the functionality of a computer. Since the method of FIG. 1 obtains an optimized Hadoop™ configuration for all jobs (or for a plurality of jobs) to be run on a cluster of nodes, the optimized configuration can be used to guide a design for a cluster of nodes. This design may encompass determining computing resources to be provided on each of the plurality of nodes. For purposes of illustration, a straightforward approach may proceed as follows: (1) Select a first trial design setup for a cluster. A design setup is a resource configuration, such as memory, for all nodes in the cluster. (2) Run the operational sequence of FIG. 1 to obtain a performance result number. (3) Decide whether or not the performance result number is acceptable. If yes, stop and choose the first trial design setup as a final design setup for the cluster. If no, then select a second trial design setup for the cluster, and repeat steps (2) and (3) above. Alternatively or additionally, a pre-chosen set or menu of trial design setups may be provided, with steps (1)-(3) being repeated for each of the menu options, and then selecting the best cluster configuration as the final design setup from among the menu options.

Figure 2:
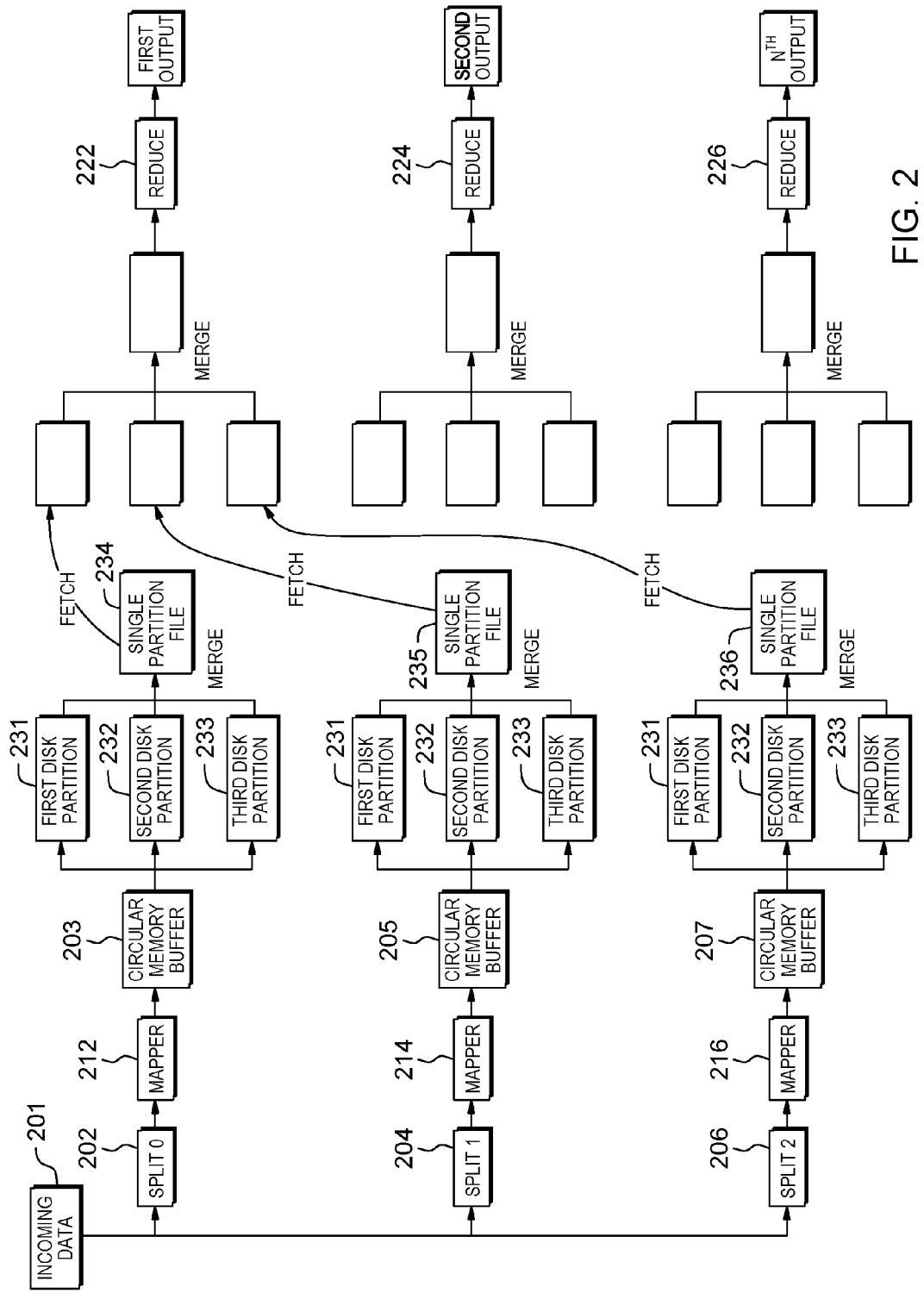
FIG. 2 is an exemplary high-level data flow diagram for a Map Reduce job.

FIG. 2 presents an illustrative high-level data flow diagram for a Map Reduce job. A Map Reduce job execution procedure includes three basic functions—map, shuffle and reduce. A plurality of Mappers 212, 214, and 216 are each configured for executing a map function. A plurality of Reducers 222, 224, and 226 are each configured for executing a reduce function. The level of performance achieved by the Mappers 212, 214, and 216 depends on the efficiency of the code that was written to implement the map function, as well as the manner in which the data is distributed. Similarly, the level of performance achieved by the Reducers 222, 224, and 226 depends on the efficiency of the code that was written to implement the reduce function, as well as the manner in which the data is distributed. On the other hand, the shuffle function is controlled by Hadoop™ itself. The efficiency of the shuffle function largely depends on setting appropriate values for the user-tunable parameters. The shuffle function includes a Mapper-side shuffle using Mappers 212, 214, and 216, and a Reducer-side shuffle using Reducers 222, 224, and 226.

Mapper-side shuffle: Incoming data 201 is divided into a plurality of splits, such as Split 0 202, Split 1 204, and Split 2 206. Each of respective splits is fed to a corresponding Mapper of Mappers 212, 214, and 216. For example, Split 0 202 is fed to Mapper 212, Split 1 is fed to Mapper 214, and Split 2 is fed to Mapper 216. After executing the map function, the output of each respective Mapper 212, 214, and 216 is buffered in a corresponding circular memory buffer 203, 205, 207. A memory size applicable to each of the circular buffers 203, 205 and 207 can be tuned by changing a parameter mapreduce.task.io.sort.mb.

When the memory of any one of the circular memory buffers, such as circular memory buffer 203, is filled to more than a threshold percent, this will trigger a thread to spill the contents of the circular memory buffer 203 into a partition of a disk or other computer readable memory device. This threshold percent is controlled by a parameter mapreduce.map.sort.spill.percent. However, the map function will not be interrupted until the circular memory buffers 203, 205, and 207 are is full even when the contents are spilling into the disk. A partition is performed before writing the data into disk to provide a first disk partition 231, a second disk partition 232, and a third disk partition 233. The total number of disk partitions is equal to the number of Reducers 222, 224, and 226. Finally, the first, second and third disk partitions 231, 232, and 233 are merged into a first single partitioned file 234, a second single partitioned file 235, and a third single partitioned file 236. A number or quantity of concurrent streams for merging is controlled by a parameter mapreduce.task.io.sort.factor. The Mapper side shuffle may performed in local disk instead of HDFS, which avoids the overhead caused by data copying and transferring.

Reducer-side shuffle: Each respective disk partition 231, 232, 233, which may reside on a Mapper-side disk, is fetched using a Reducer-side shuffle procedure using Reducers 222, 224, and 226. Each of respective Reducers 222, 224, and 226 fetches input data from a corresponding disk partition. Each of the corresponding disk partitions includes data received from all three Mappers 212, 214, and 216. For example, Reducer 222 fetches input data from the first disk partition 231. Data in the first disk partition 231 was received from Mappers 212, 214, and 216. Likewise, Reducer 224 fetches input data from the second disk partition 232. Data in the second disk partition 232 was received from Mappers 212, 214, and 216. Similarly, Reducer 226 fetches input data from the third disk partition 233. Data in the third disk partition 233 was received from Mappers 212, 214, and 216.

A parameter mapreduce.reduce.shuffle.parallelcopies indicates a maximum number of threads that can be used to copy data from the mapper side including Mappers 212, 214, 216 to the reducer side including Reducers 222, 224, and 226. As previously indicated, the data is buffered into one or more respective circular memory buffers (not shown), and the data is written to a corresponding disk partition (not shown) once the data size is bigger than a threshold. The threshold size can be tuned using a parameter mapreduce.reduce.shuffle.input.buffer.percent. A merge operation is triggered when the data size exceeds a pre-defined threshold controlled by a parameter mapreduce.reduce.shuffle.merge.percent.

Figure 3:
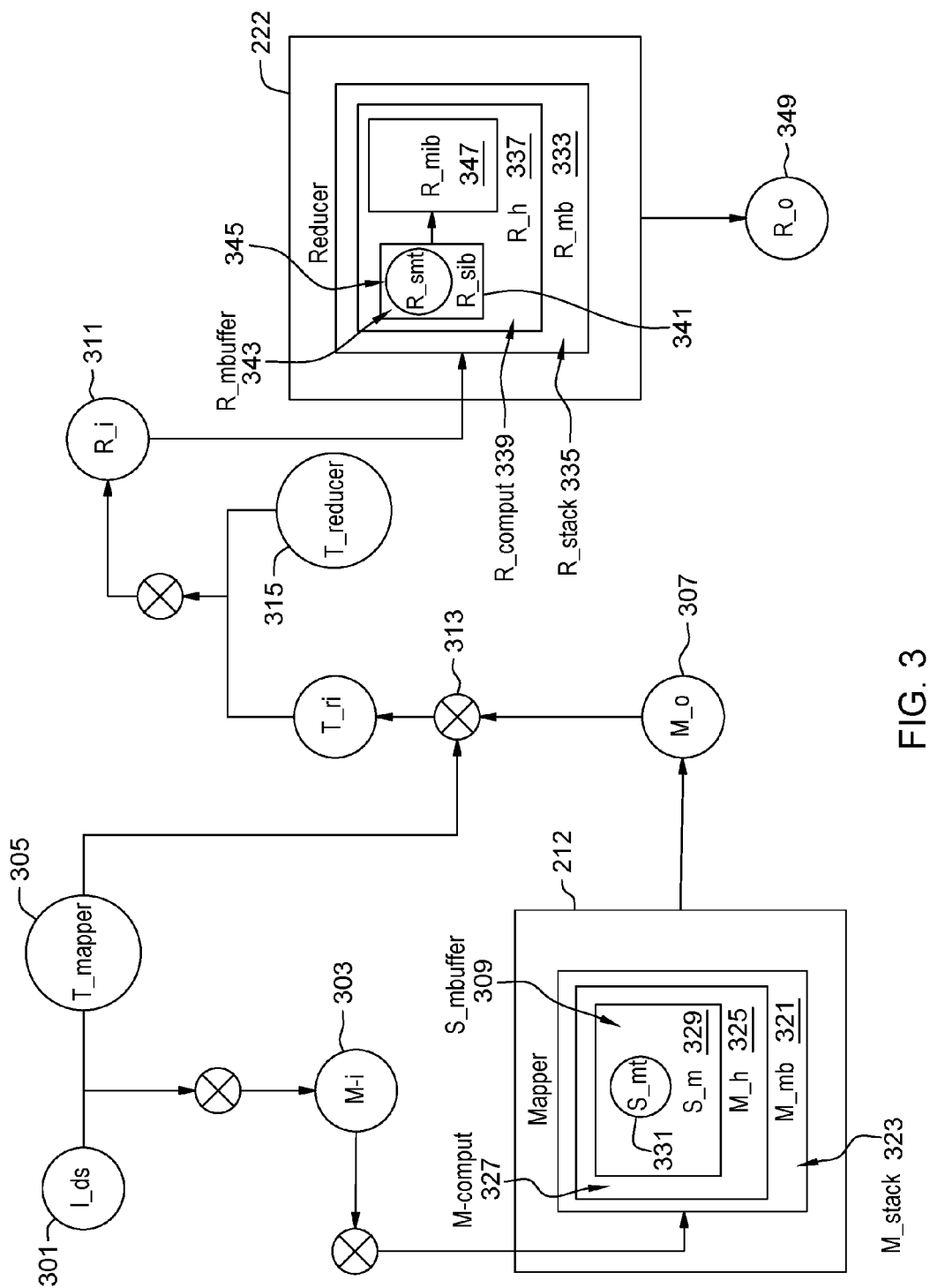
FIG. 3 is an exemplary data flow diagram showing illustrative key parameters which may affect performance of a MapReduce job.

FIG. 3 is an exemplary data flow diagram showing illustrative key parameters for a MapReduce job. Given input data having an input data size $I\_ds$ 301, an input for each Mapper $M\_i$ 303 can be computed once a total number of Mappers $T\_mapper$ 305 is derived. The input data is fed into the Mapper 212 (FIGS. 2 and 3) for execution in a container. Once the buffering Mapper output data size $M\_o$ 307 (FIG. 3) is bigger than a portion of sort memory use to buffer Mapper output ($S\_mbuffer$) 309, an action for spilling to disk is triggered. An input for each Reducer $R\_i$ 311 can be estimated using one or more of: the total number of Mappers ($T\_mapper$) 305, the Mapper output of data size $M\_o$ 307, a total number of Reducers ($T\_reducer$) 315, or a total reducer input data size ($T\_ri$) 313.

In the data flow diagram of FIG. 3, $M\_mb$ 321 is the memory capacity of the Mapper 212, $M\_stack$ 323 is the size of the stack memory for the Mapper 212, $M\_h$ 325 is the size of the heap memory for the Mapper 212, $M\_comput$ 327 identifies a portion of the heap memory of the Mapper 212 that is used for computation, $S\_m$ 329 is sort memory, $S\_mt$ 331 is a sort memory threshold for spill, $R\_mb$ 333 is the memory capacity of the Reducer 222, $R\_stack$ 335 is the size of stack memory for the Reducer 222, $R\_h$ 337 is the size of heap memory for the Reducer 222, $R\_comput$ 339 identifies a portion of the heap memory of the Reducer 222 that is used for computation, $R\_sib$ 341 identifies a portion of the heap memory of the Reducer 222 that is used as a shuffle input buffer, $R\_mbuffer$ 343 identifies a portion of $R\_sib$ 341 used to buffer Mapper 212 output, $R\_smt$ 345 is a threshold for initiating the merger of the Mapper 212 output, $R\_mib$ 347 is the Reducer-merged input buffer, and $R\_o$ 349 is output data size for the Reducer 222.

Figure 4:
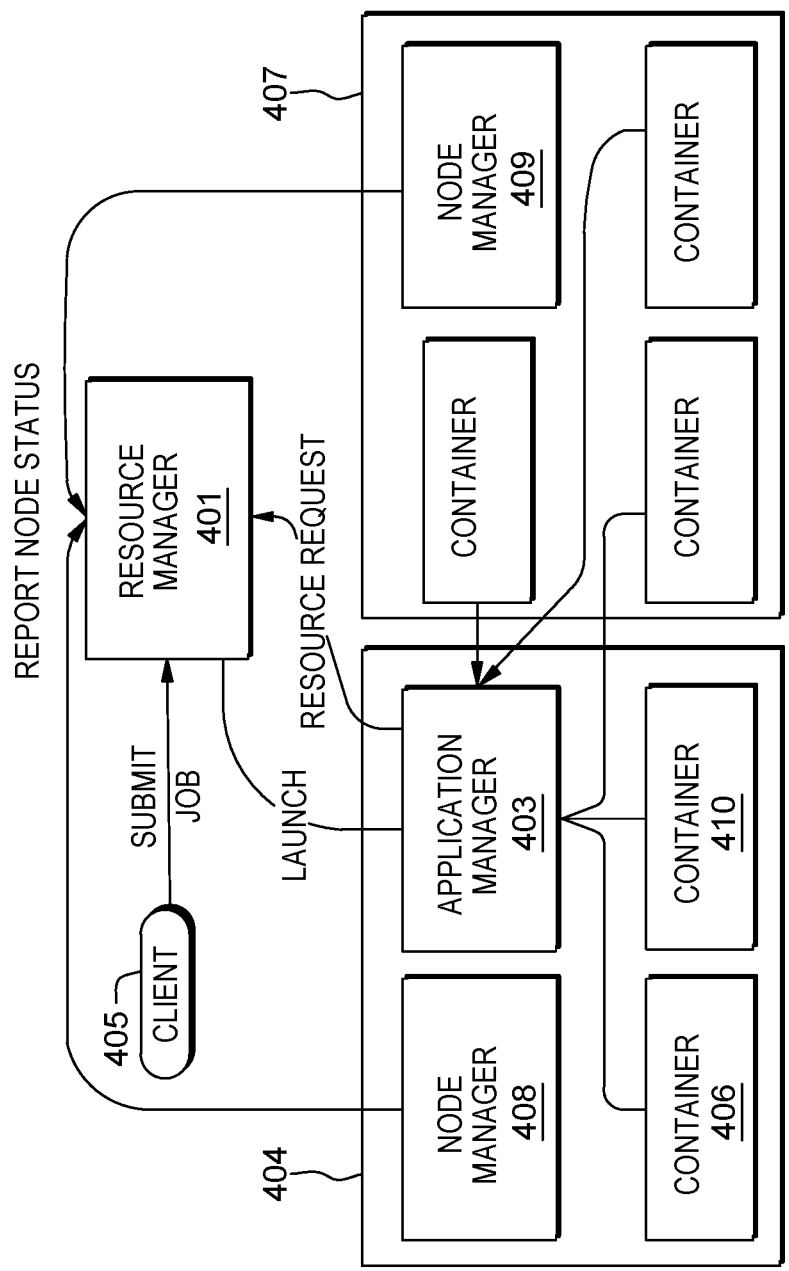
FIG. 4 is a block diagram illustrating an exemplary resource manager and application master for managing and distributing computing resources in a cluster.

FIG. 4 is a block diagram illustrating an exemplary resource manager 401 and application master 403 for managing and distributing computing resources in a cluster. In this example, the resource manager 401 is implemented using "Yet Another Resource Negotiator" (Yarn). Yarn was introduced in Hadoop™ Map Reduce 2.0 and is designed to solve scalability shortcomings caused by a jobtracker. The jobtracker is responsible for both scheduling jobs and tracking tasks. Yarn uses the resource manager 401 to manage and monitor cluster computing resources, while the application master 403 manages all the affairs related to one individual Map Reduce job execution. When a client 405 submits a job and requests to run the job on a cluster, the resource manager 401 launches the application master 403 on a first node 404 and hands this job to this application master 403. Next, the application master 403 negotiates with the resource manager 401 to request one or more containers 406, 410 for running tasks. Once the job starts running, the application master 403 is responsible for keeping track of the execution progress. The resources on each of respective nodes, including the first node 404 and a second node 407, are managed by a corresponding node manager 408, 409 to guarantee the application has not used more resources than allocated. The node managers 408, 409 regularly report node status to the resource manager 401.

According to a set of further embodiments, a model is provided for reducing Map Reduce job execution cost by maximizing utilization of computing resources in a cluster. First, an in-depth analysis of one or more key factors related to job performance is conducted. Then an effective model is presented for quantizing job execution costs. This model is based upon the following assumptions: (1) a quantity of input data for each of the Mappers 212, 214, and 216 (FIG. 2) is almost equal; (2) a quantity of input data for each of the Reducers 222, 224, and 226 is almost equal; (3) no overlap is considered between the Mappers 212, 214, and 216 and the Reducers 222, 224, and 226.

MapReduce is analyzed to identify a group of key factors relating to Map Reduce job performance. These key factors are presented hereinafter in Table 1. Given a set of input data, an input for each of the Mappers 212, 214, and 216 (FIG. 2) can be computed once the number of mappers is derived. The input data is fed into each of the Mappers 212, 214, and 216 for execution in a container. Each of the Mappers 212, 214, and 216 includes a memory $M_{mb}$ comprising two parts: a stack memory and a heap memory. The stack memory is reserved for storing running code and the heap memory is used to buffer contents. Specifically, as one part of heap, the sort memory is reserved for buffering mapper output to avoid frequent I/O operations. However, once output data size is bigger than $S_{mbuffer}$, the action for spilling to disk will be triggered, incurring I/O cost.

An input for each of the Reducers 222, 224, and 226 can be estimated using the total number of Mappers 212, 214, and 216, mapper output, and the number of Reducers 222, 224, and 226. Similar to the memory structure used in Mappers 212, 214, and 216, the memory structure used in Reducers 222, 224, and 226 includes both stack and heap memory. Before the execution of the reduce function, the reducer side shuffle is used to control the memory space. A portion of the heap memory is used to buffer shuffle-related content $R_{sib}$. Output from Mappers 212, 214, and 216 is fetched from remote/local machines, and part of the $R_{sib}$ is reserved to buffer the contents. If the output from any of the Mappers 212, 214, and 214 exceeds the threshold memory (part of $R_{sib}$), i.e., $R_{smt}$, then a thread will be initiated to merge the contents. The final merge of all Mappers 212, 214, and 216 will be buffered into memory $R_{mib}$, which is part of heap. Then Reducer 222, 224, or 226 will be launched to take the merged result as input and pour the output to HDFS as $R_o$.

TABLE 1

Factors that are key to job performance optimization: the variables used to model job execution cost.

| Parameter Name | Unknown Parameters | Variables | Derivation or Related MapReduce Parameters |
|---|---|---|---|
| mapper input | $M_i$ | $x_0$ | $I_{ds}/T_{mapper}$ |
| memory capacity for mapper | $M_{mb}$ | $x_1$ | mapreduce.map.memory.mb |
| sort memory | $S_m$ | $x_2$ | mapreduce.task.io.sort.mb |
| sort memory threshold for spill | $S_{mt}$ | $x_3$ | mapreduce.task.io.sort.mbx-spill.percent |
| reducer input | $R_i$ | $x_4$ | mapreduce.task.io.sort.mb |
| the memory capacity for reducer | $R_{mb}$ | $x_5$ | mapreduce.reduce.memory.mb |
| reducer side shuffle input buffer | $R_{sib}$ | $x_6$ | mapreduce.reduce.shuffle.input.buffer.percent |
| buffer threshold to initiate merge | $R_{smt}$ | $x_7$ | mapreduce.reduce.shuffle.merge.percent |
| buffer for the merged result | $R_{mib}$ | $x_8$ | mapreduce.reduce.input.buffer.percent |
| parallel shuffles | $N_{parallel}$ | $x_9$ | mapreduce.reduce.shuffle.parallelcopies |
| number of computing nodes | $N_n$ | $x_{10}$ | |

As shown in Table 1, an illustrative group of key factors that are significant to job performance are provided to describe resource supply-demand relations. It is assumed that computing nodes are all identical and the computing resources in the cluster can then be derived using the number of nodes $N_n$. With these variables, we can derive the input/output data of mapper/reducer, the data size that can be buffered in memory and the data that has to be written into disk.

Modeling Map Reduce Job Execution Costs: Let x denote a set of decision variables $x=\{x_0, x_1, \ldots, x_{10}\}$ corresponding to any of the unknown parameters as defined in Table 1. The cost functions may vary with different applications. For example, CPU-intensive applications have disparate requirements relative to data intensive applications in terms of memory capacity to buffer the output of Mappers 212, 214, and 216. In the context of data-intensive applications, the job execution cost primarily includes a mapper cost for Mappers 212, 214, and 216 and a reducer cost for Reducers 222, 224, and 226. A target function for describing job execution cost is defined as:

$$TF = f(T_{mapper}, T_{cfm}, M_{cost}, T_{reducer}, T_{cfr}, R_{cost}) \quad (1)$$
$$\triangleq TF_{mapper} + TF_{reducer} + c$$

where $T_{mapper}$=the number of total mappers, $T_{cfm}$=the total number containers for mapper in one node, $M_{cost}$=the default cost incurred by a mapper, $T_{reducer}$=the number of reducers, $T_{cfr}$=the total number of containers for reducer, $R_{cost}$=the default cost incurred by a reducer, $TF_{mapper}$=the mapper cost, $TF_{reducer}$=the reducer cost, and c=other overhead costs.

Modeling Mappers 212, 214, and 216: The previously presented target function for describing mapper cost may be expanded as:

$$TF_{mapper} = f_{tfm}(T_{mapper}, T_{cfm}, M_{cost}) \quad (2)$$
$$\triangleq \left\lceil \frac{T_{mapper}}{N_n \times T_{cfm}} \right\rceil \times M_{cost}$$

This cost is the product of one Mapper's cost for any of the Mappers 212, 214, and 216, and the number of rounds for running a mapper function on computing nodes. The key now is to model a total number of Mappers 212, 214, and 216, a total number of containers in one node, and one Mapper's cost. The total number of Mappers can be derived from input data and mapper input:

$$T_{mapper} = f_{tm}(I_{ds}, M_i) = \left\lceil \frac{I_{ds}}{M_i} \right\rceil = \left\lceil \frac{I_{ds}}{x_0} \right\rceil \quad (3)$$

The number of total containers for mappers can be represented as:

$$T_{cfm} = f_{tcfm}(T_{mem}, M_{mb}) = \left\lfloor \frac{T_{mem}}{M_{mb}} \right\rfloor = \left\lfloor \frac{T_{mem}}{x_1} \right\rfloor \quad (4)$$

where $T_{mem}$ denotes the total reserved memory for running containers.

The cost for a mapper includes five parts:

$$M_{cost} = f_{mc}(M_{mb}, T_{mem}, M_i, M_{comput}, M_o, S_{mt}) \quad (5)$$
$$= f_{mc1}(M_i, M_{comput}) + f_{mc2}(M_i) + f_{mc3}(M_o, S_{mt}) +$$
$$f_{mc4}(M_o, S_{mt}, S_{mbuffer}) + d_{mo}$$

where $M_{comput}$=memory reserved to buffer Mapper—input data size, $M_o$=Mapper—output data size, and $d_{mo}$=other overhead costs.

A function $f_{mc1}(M_i, M_{comput})$ represents a cost for loading the split in map phase:

$$f_{mc1}(M_i, M_{comput}) = \left\lceil \frac{M_i}{M_{comput} - S_m} \right\rceil \times d_{mread1} + M_i + d_{mread2} \quad (6)$$
$$= \left\lceil \frac{x_0}{\alpha_m x_1 - x_2} \right\rceil \times d_{mread1} + x_0 \times d_{mread2}$$

Where $d_{mread1}$=cost for finding the content on the disk, $d_{mread2}$=cost for reading content from disk, and $\alpha_m \in (0,1)$=percent of memory used as heap memory.

A function $f_{mc2}(M_i)$ represents a cost for performing a Mapper task:

$$f_{mc2}(M_i) = M_i \times d_{mexe} = x_0 \times d_{mexe} \quad (7)$$

where $d_{mexe}$=delay caused by executing the map function.

A function $f_{mc3}(M_o, S_{mt})$ represents a cost for spilling the contents of one of the circular memory buffers 203, 205 or 207 (FIG. 2) to disk:

$$f_{mc3}(M_o, S_{mt}) = \left\lceil \frac{M_o}{S_{mt}} \right\rceil \times d_{mspill1} + M_o \times d_{mspill2} \quad (8)$$
$$= \left\lceil \frac{\beta_1 x_0 + \omega_1}{x_3} \right\rceil \times d_{mspill1} + (\beta_1 x_0 + \omega_1) \times d_{mspill2}$$

where $d_{mspill1}$=delay for finding a place on disk for outputting, $d_{mspill2}$=delay for writing data to disk, and $M_o = \beta_1 x_0 + \omega_1$. Here it is assumed that the output of each of the Mappers 212, 214, and 216 is a linear function of the Mapper input, where $\beta_1$ denotes a slope for the linear function and $\omega_1$ denotes an intercept for the linear function.

When output from any of the respective Mappers 212, 214, and 216 cannot fit into the corresponding circular memory buffer 203, 205 or 207, i.e., $S_{mt}$, $f_{mc4}(M_o, S_{mt}, S_{mbuffer})$ indicates a cost function for adjusting $S_{mbuffer}$ to avoid I/O operation:

$$f_{mc4}(M_o, S_{mt}, S_{mbuffer}) = \left\lfloor \frac{M_o}{S_{mt}} \right\rfloor \times \frac{d_{mspill3}}{S_{mbuffer}} \quad (9)$$
$$= \left\lfloor \frac{\beta_1 x_0 + \omega_1}{x_3} \right\rfloor \times \frac{d_{mspill3}}{x_2 - x_3}$$

where $d_{mspill3}$=delay caused by I/O operation.

Since I/O cost is much more expensive, the circular memory buffer 203, 205 or 207 should be big enough to hold the respective Mapper 212, 214, or 216 output to avoid high overhead.

Note that the sum of $M_h$ and $M_{stack}$ is $M_{mb}$:

$$M_{mb} = M_h + M_{stack} \quad (10)$$

The sum of $S_m$ and $M_{comput}$ is $M_h$ $$M_h = S_m + M_{comput} \Rightarrow M_{comput} = (1 - \alpha_m) x_1 - x_2 \quad (11)$$

The sum of $S_{mt}$ and $S_{mbuffer}$ is $S_m$:

$$S_m = S_{mt} + S_{mbuffer} \Rightarrow S_{mbuffer} = x_2 - x_3 \quad (12)$$

And $$\frac{S_{mbuffer}}{S_m} = \frac{x_2 - x_3}{x_2} \in [\alpha_{smin}, \alpha_{smax}] \quad (13)$$

where $\alpha_{smin}$, $\alpha_{smax}$ are used to control the above ratio, and $\alpha_{smax} > \alpha_{smin}$.

Modeling Reducers 222, 224, and 226: The function for representing reducer cost for Reducers 222, 224, and 226 is:

$$TF_{reducer} = f_{tfr}(T_{reducer}, T_{cfr}, R_{cost}) \triangleq \left\lceil \frac{T_{reducer}}{N_n \times T_{cfr}} \right\rceil \times R_{cost} \quad (14)$$

Similar to Mapper cost, it is the product of one Reducer's cost and the number of rounds for running Reducer in a cluster. Next the total number of Reducers 222, 224, and 226, the total number of containers in one node, and the default cost for the Reducers all need to be derived. A total number of Reducers is given by:

$$T_{reducer} = f_{treducer}(T_{ri}, R_i) = \left\lceil \frac{T_{ri}}{R_i} \right\rceil \quad (15)$$

where $T_{ri}$ is the size of input data for all Reducers 222, 224, and 226, which can be derived using the number of Mappers 212, 214, and 216, and Mapper output:

$$T_{ri} = f_{tri}(T_{mapper}, M_o) = T_{mapper} \times M_o \quad (16)$$
$$= T_{mapper} \times (\beta_1 x_0 + \omega_1)$$

where $T_{mapper}$ can be found at Equation (3). Then total reducer input can be represented as:

$$T_{reducer} = \left\lceil \frac{T_{mapper} \times (\beta_1 x_0 + \omega_1)}{x_4} \right\rceil \quad (17)$$

A number of total containers for reducers can be derived as:

$$T_{cfr} = f_{tcfr}(T_{mem}, T_{mb}) = \left\lfloor \frac{T_{mem}}{R_{mb}} \right\rfloor = \left\lfloor \frac{T_{mem}}{x_5} \right\rfloor \quad (18)$$

A reducer's cost includes five parts:

$$R_{cost} = f_{rc}(R_{mb}, T_{mem}, T_{mapper}, N_{parallel}, M_o, R_i, R_{sib}, R_{smt}, R_{mi}, R_{mib}, R_{comput}, R_o) = f_{rc1}(T_{mapper}, N_{parallel}, M_o) + f_{rc2}(R_i, R_{sib}) + f_{rc3}(R_i, R_{smt}) + f_{rc4}(R_{mi}, R_{mib}) + f_{rc5}(R_o, R_{comput}) \quad (19)$$

where $R_{mi}$=merged input for reducer, and $R_{comput}$=a portion of heap memory reserved for computation.

A function $f_{rc1}(T_{mapper}, N_{parallel}, M_o)$ represents a cost for reading Mapper 212, 214, and 216 output from remote or local machines:

$$f_{rc1}(T_{mapper}, N_{parallel}, M_o) = \left\lceil \frac{T_{mapper}}{N_{parallel}} \right\rceil \times M_o \times d_{rread} \quad (20)$$
$$= \left\lceil \frac{T_{mapper}}{x_9} \right\rceil \times (\beta_1 x_0 + \omega_1) \times d_{rread}$$

where $N_{parallel}$=a number of parallel copies, $d_{rread}$=a cost for reading from disk and transferring from Mapper side to Reducer side.

A function $f_{rc2}(R_i, R_{sib})$ represents a cost function for loading Mapper 212, 214, and 216 output into Reducer 222, 224, and 226:

$$f_{rc2}(R_i, R_{sib}) = \left\lfloor \frac{R_i}{R_{sib}} \right\rfloor \times (d_{rsibuf1} + R_{sib} \times d_{rsibuf2}) \quad (21)$$
$$= \left\lfloor \frac{x_4}{x_6} \right\rfloor \times (d_{rsibuf1} + x_6 \times d_{rsibuf2})$$

where $d_{rsibuf1}$=delay to locating a place on disk for writing data, and $d_{rsibuf2}$=the cost to write per-unit data into disk.

A function $f_{rc3}(R_i, R_{smt})$ represents a cost for merging reducer input:

$$f_{rc3}(R_i, R_{smt}) = \left\lfloor \frac{R_i}{R_{smt}} \right\rfloor \times \left( \begin{array}{c} d_{rsmerge1} + R_{smt} \times \\ d_{rsmerge2} + \frac{d_{rsmerge3}}{R_{mbuffer}} \end{array} \right) \quad (22)$$
$$= \left\lfloor \frac{x_4}{x_7} \right\rfloor \times \left( d_{rsmerge1} + x_7 d_{rsmerge2} + \frac{d_{rsmerge3}}{x_6 - x_7} \right)$$

where $d_{rsmerge1}$=delay caused by triggering the merge operation, $d_{rsmerge2}$=a delay for buffering per-unit merging results into memory, and $d_{rsmerge3}$=a delay caused when a buffer cannot hold Mapper 212, 214, and 216 input.

It is expected that the $R_{mbuffer}$ should be large enough to avoid the termination of loading Mapper 212, 214, and 216 output even when the amount of data reaches the threshold.

When $R_{mi}$ cannot fit in a Reducer 222, 224, or 226 input buffer, the merged input ($R_{mi}$) will be output to disk. And $f_{rc4}(R_{mi}, R_{mib})$ denotes a cost function for buffering Reducer-merged input:

$$f_{rc4}(R_{mi}, R_{mib}) = \left\lfloor \frac{R_{mi}}{R_{mib}} \right\rfloor \times (d_{ribuf1} + R_{mib} \times d_{ribuf2}) \quad (23)$$
$$= \left\lfloor \frac{\beta_2 x_4 + \omega_2}{x_8} \right\rfloor \times (d_{ribuf1} + x_8 \times d_{ribuf2})$$

where $d_{ribuf1}$=a cost for writing per-unit data to disk, and $d_{ribuf2}$=a cost to buffer the data in memory.

A function $f_{rc5}(R_o, R_{comput})$ represents a cost of placing Reducer 222, 224, or 226 output into HDFS:

$$f_{rc5}(R_o, R_{comput}) = \left\lfloor \frac{R_o}{R_{comput}} \right\rfloor \times (d_{rwrite1} + R_o \times d_{rwrite2}) \quad (24)$$
$$= \left\lfloor \frac{\beta_2 \beta_3 x_4 + (\beta_3 \omega_2 + \omega_3)}{\alpha_r x_5 - x_8} \right\rfloor \times d_{rwrite1} +$$
$$\beta_2 \beta_3 x_4 \times d_{rwrite2} + (\beta_3 w_2 + \omega_3) \times d_{rwrite2}.$$

where the merged Reducer 222, 224, or 226 input is modelled as a linear function of Reducer input $R_{mi} = \beta_2 R_i + \omega_2 = \beta_2 x_4 + \omega_2$, the Reducer output is modelled as a linear function of the merged Reducer input $R_o = \beta_3 R_{mi} + \omega_3$, $d_{rwrite1}$ is a cost for locating disk space for writing on HDFS, and $d_{rwrite2}$ is a cost incurred by writing the contents on HDFS.

The sum of $R_h$ and $R_{stack}$ is $R_{mb}$:

$$R_{mb} = R_h + R_{stack} \quad (25)$$

The sum of $R_{comput}$ and $R_{mib}$ is $R_h$:

$$R_h = R_{comput} + R_{mib} \Rightarrow R_{comput} = (1 - \alpha_r) x_5 - x_8 \quad (26)$$

The sum of $R_{smt}$ and $R_{mbuffer}$ is $R_{sib}$:

$$R_{sib} = R_{smt} + R_{mbuffer} \Rightarrow R_{mbuffer} = x_6 - x_7 \quad (27)$$

And $$\frac{R_{mbuffer}}{R_{sib}} = \frac{x_6 - x_7}{x_6} \in [\alpha_{rmin}, \alpha_{rmax}] \quad (28)$$

where $\alpha_{rmin}$ and $\alpha_{rmax}$ are constants to control the above ratio value, and $\alpha_{rmax} > \alpha_{rmin}$.

Constraints for Variables: The objective function TF(x) in Equation (1) is minimized subject to the following constraints.

Input data size for one Mapper 212, 214, or 216 input should be a positive real value and less than the total memory size:

$$M_i = x_0 \in [0, T_{mem}]$$

A memory capacity for the Mapper 212, 214, or 216 is constrained by the following equation:

$$M_{mb} = x_1 \in \left[\frac{T_{mem}}{T_{cpu}}, 4096\right] \text{ and } \in Z^+$$

where $T_{cpu}$ denotes the number of Central Processing Units (CPUs) in one node.

The heap memory for Mappers 212, 214, and 216 are each constrained to be 95% of the memory capacity for a Mapper since 5% is usually enough for the stack memory:

$$M_h = \alpha_m M_{mb} = 0.95 M_{mb} = 0.95 x_1 \text{ and } \in R^+$$

A sorted memory is a part of heap memory, and this memory ratio is subject to:

$$\frac{S_m}{M_h} = \frac{x_2}{M_h} \in [0.2, 0.7]$$

The spill percent is the ratio of $$\frac{S_{mt}}{S_m}$$

and is subject to:

$$\frac{S_{mt}}{S_m} = \frac{x_3}{x_2} \in [0.5, 0.9]$$

Reducer 222, 224, and 226 input data size is a positive real value which should be less than the total memory:

$$R_i = x_4 \in [0, T_{mem}]$$

Similar to the constraints on Mapper 212, 214, and 216 memory, Reducer 222, 224, and 226 memory is subject to:

$$R_{mb} = x_5 \in \left[\frac{T_{mem}}{T_{cpu}}, 4096\right] \text{ and } \in Z^+$$

The heap memory of Reducer 222, 224, and 226 occupies 95% of Reducer memory:

$$R_h = \alpha_r R_{mb} = 0.95 R_{mb} = 0.95 x_5 \text{ and } \in R^+$$

A Reducer-side shuffle input buffer is a part of the heap memory, and this memory ratio is subject to:

$$\frac{R_{sib}}{R_h} = \frac{x_6}{R_h} \in [0.5, 0.9]$$

The threshold to initiate a merge operation is controlled by the following constraint:

$$\frac{R_{smt}}{R_{sib}} = \frac{x_7}{x_6} \in [0.4, 0.8]$$

A Reduce input buffer percent is subject to:

$$\frac{R_{mib}}{R_h} = \frac{x_8}{R_h} \in [0.1, 0.9]$$

A number of parallel copies for each of the Reducers 222, 224, and 226 is subject to:

$$N_{parallel} = x_9 \in [1, 100] \text{ and } \in Z^+$$

A number of computing nodes in a cluster should be a positive integer:

$$N_n = x_{10} \in Z^+$$

Parameter Estimation—Mixed-Integer Programming: The functions, constraints, and models presented in Equations (1)-(28) can be used to formulate a discontinuous mixed-integer nonlinear programming (MINLP) problem which is summarized in Equations (29)-(39):

$$\min f(x) = \quad (29)$$

$$\left[\frac{\left\lceil\frac{I_{ds}}{x_0}\right\rceil}{x_{10}\left\lfloor\frac{T_{mem}}{x_1}\right\rfloor}\right]\left(\left\lceil\frac{x_0}{\alpha_m x_1 - x_2}\right\rceil d_{mread1} + x_0 d_{mread2} + x_0 d_{mexe} + \right.$$

$$\left\lceil\frac{\beta_1 x_0 + \omega_1}{x_3}\right\rceil d_{mspill1} + (\beta_1 x_0 + \omega_1) d_{mspill2} +$$

$$\left\lfloor\frac{\beta_1 x_0 + \omega_1}{x_3}\right\rfloor \left\lceil\frac{d_{mspill3}}{x_2 - x_3}\right\rceil \right) +$$

$$\left[\frac{\left\lceil\frac{I_s}{x_0}\right\rceil(\beta_1 x_0 + w_1)}{x_{10}\left\lfloor\frac{T_{mem}}{x_5}\right\rfloor}\right]\left(\left(\left\lceil\frac{I_{ds}}{x_0}\right\rceil\right)(\beta_1 x_0 + \omega_1)d_{rread} + \right.$$

$$\left\lfloor\frac{x_4}{x_6}\right\rfloor(d_{rsibuf1} + x_6 d_{rsibuf2}) +$$

$$\left\lfloor\frac{x_4}{x_7}\right\rfloor\left(d_{rsmerge1} + x_7 d_{rsmerge2} + \frac{d_{rsmerge3}}{x_6 - x_7}\right) +$$

$$\left\lfloor\frac{\beta_2 x_4 + \omega_2}{x_8}\right\rfloor(d_{ribuf1} + x_8 d_{ribuf2}) + \left[\frac{\beta_2 \beta_3 x_4 + (\beta_3 w2 + \omega_3)}{\alpha_r x_5 - x_8}\right]$$

$$d_{rwrite1} + \beta_2 \beta_3 d_{rwrite2} x_4 + (\beta_3 w2 + \omega_3) d_{rwrite2}) + cs.t.$$

$$x_0, x_4 \in [0, T_{mem}] \quad (30)$$

$$x_1, x_5 \in \left[\frac{T_{mem}}{T_{cpu}}, 4096\right] \quad (31)$$

$$\frac{x_2}{0.95 x_1} \in [0.2, 0.7] \quad (32)$$

$$\frac{x_3}{x_2} \in [\max(0.5, 1-\alpha_{smax}), \min(0.9, 1-\alpha_{smin})] \quad (33)$$

$$\frac{x_6}{0.95 x_5} \in [0.5, 0.9] \quad (34)$$

$$\frac{x_7}{x_6} \in [\max(0.4, 1-\alpha_{rmax}), \min(0.8, 1-\alpha_{rmin})] \quad (35)$$

$$\frac{x_8}{0.95 x_5} \in [0.1, 0.9] \quad (36)$$

$$x_9 \in [1, 100] \quad (37)$$

$$x_1 \geq 0 \quad (38)$$

$$x_1, x_5, x_9, x_{10} \in Z^+ \quad (39)$$

Due to the fact that ceiling and flooring functions are used to compute some integer quantities, such as the numbers of running Mapper rounds in Equation (2) and the total number of Mappers in Equation (3), an objective function represented by Equation (29) is discontinuous. This discontinuity often causes a standard optimization algorithm to slowly converge. A very limited number of algorithms can be applied to solve the function. Moreover, some unknowns appear in the denominators of the functions, which makes the problem nonconvex. This nonconvexity often results in a local method being performed using a poor local minimizer.

In view of the foregoing difficulties, the discontinuous MINLP problem may be reformulated as a 0-1 mixed-integer linear program. Mixed-integer linear programs can be solved efficiently to optimality by any of a number of existing software programs such as IBM's ILOG CPLEX from International Business Machines of Armonk, N.Y., or by a software framework such as Solving Constraint Integer Programs (SCIP). SCIP is configured for implementing constraint integer programming (CIP), a paradigm that integrates constraint programming (CP), mixed integer programming (MIP), and satisfiability (SAT) modeling and solving techniques. SOP is freely available in source code for academic and non-commercial use and can be downloaded from the Zuse Institute Berlin by following the link http://scip.zib.de.

Constraint integer programming is a generalization of MIP that allows for inclusion of arbitrary constraints that are reduced to linear constraints on continuous variables after all integer variables have been fixed. CIPs can be treated by a combination of techniques used to solve CPs, MIPs, and SAT problems: propagating the variables' domains by constraint specific algorithms, solving a linear programming (LP) relaxation of the problem, strengthening the LP by cutting plane separation, and analyzing infeasible subproblems to infer useful global knowledge about the problem instance.

In reformulating the discontinuous MINLP problem as a 0-1 mixed-integer linear program, it is observed that:

$$y = \lceil x \rceil \text{ if and only if } \begin{cases} y \in Z \\ x \leq y \\ y \leq x+1-\varepsilon \end{cases}$$

$$y = \lfloor x \rfloor \text{ if and only if } \begin{cases} y \in Z \\ y \leq x \\ x \leq y-1-\varepsilon \end{cases}$$

where $\varepsilon$ is a machine epsilon.

Thus, we replace $\lceil x \rceil$ and $\lfloor x \rfloor$ by y and impose $\{y \in Z, x \leq y \leq x+1-\varepsilon\}$ and $\{y \in Z, y \leq x \leq y-1+\varepsilon\}$ respectively, in the constraint set.

The resulting 0-1 mixed-integer linear programming problem is defined as in Equations (40)-(55):

$$\min f(x, y, z, t) = y_1(z_1 d_{mread1} + x_0 d_{mread2} + x_0 d_{mexe} + \quad (40)$$
$$z_2 d_{mspill1} + (\beta_1 x_0 + \omega_1) d_{mspill2} + z_3 \frac{d_{mspill3}}{x_2 - x_3}) +$$
$$y_2(z_4(\beta_1 x_0 + \omega_1) d_{rread} + z_5(d_{rsibuf1} + x_6 d_{rsibuf2}) +$$
$$z_6 \left( d_{rsmerge1} + x_7 d_{rsmerge2} + \frac{d_{rsmerge3}}{x_6 - x_7} \right) +$$
$$z_7(d_{ribuf1} + x_8 d_{ribuf2}) + z_8 d_{rwrite1} +$$
$$\beta_2 \beta_3 d_{rwrite2} x_4 + (\beta_3 w2 + \omega_3) d_{rwrite2}) s.t.$$

$$\frac{l_{ds}}{x_0} \leq t_1 \leq \frac{l_{ds}}{x_0} + 1 - \varepsilon \quad (41)$$

$$\frac{T_{mem}}{x_1} - 1 + \varepsilon \leq t_2 \leq \frac{T_{mem}}{x_1} \quad (42)$$

$$\frac{T_{mem}}{x_5} - 1 + \varepsilon \leq t_3 \leq \frac{T_{mem}}{x_5} \quad (43)$$

$$\frac{t_1(\beta_1 x_0 + \omega_1)}{x_4} \leq t_4 \leq \frac{t_1(\beta_1 x_0 + \omega_1)}{x_4} + 1 - \varepsilon \quad (44)$$

$$\frac{t_1}{x_{10} t_2} \leq y_1 \leq \frac{t_1}{x_{10} t_2} + 1 - \varepsilon \quad (45)$$

$$\frac{t_4}{x_{10} t_3} \leq y_2 \leq \frac{t_4}{x_{10} t_3} + 1 - \varepsilon \quad (46)$$

$$\frac{x_0}{\alpha_m x_1 - x_2} \leq z_1 \leq \frac{x_0}{\alpha_m x_1 - x_2} + 1 - \varepsilon \quad (47)$$

$$\frac{\beta_1 x_0 + \omega_1}{x_3} \leq z_2 \leq \frac{\beta_1 x_0 + \omega_1}{x_3} + 1 - \varepsilon \quad (48)$$

$$\frac{\beta_1 x_0 \omega_1}{x_3} - 1 + \varepsilon \leq z_3 \leq \frac{\beta_1 x_0 + \omega_1}{x_3} \quad (49)$$

$$\frac{t_1}{x_9} \leq z_4 \leq \frac{t_1}{x_9} + 1 - \varepsilon \quad (50)$$

$$\frac{x_4}{x_6} - 1 + \varepsilon \leq z_5 \leq \frac{x_4}{x_6} \quad (51)$$

$$\frac{x_4}{x_7} - 1 + \varepsilon \leq z_6 \leq \frac{x_4}{x_7} \quad (52)$$

$$\frac{\beta_2 x_4 + \omega_2}{x_8} - 1 + \varepsilon \leq z_7 \leq \frac{\beta_2 x_4 + \omega_2}{x_8} \quad (53)$$

Equations (30) through (39) \quad (54)

$$y, z, t \in Z^+ \quad (55)$$

Equations (40)-(55) can be converted into a mixed-integer nonlinear-polynomial program. Due to the fact that one is dealing with a minimization problem, any term of the form $$\frac{x}{y}, y \geq 0$$

in the objective function can be replaced by a new variable $\alpha$. A bilinear constraint is added as follows:

$$x \leq \alpha y. \quad (56)$$

After applying the transformation of Equation (56), a mixed-integer bilinear program is obtained. This program has terms of the form xy, y∈$Z^+$ in both the objective and the constraint set and, thus, can be linearized.

Note that y is usually bounded by an upper bound $\bar{y}$. y∈[0, $\bar{y}$] can be uniquely represented as $$y = \sum_{i=0}^{\lfloor \frac{\log(\bar{y})}{\log(2)} \rfloor} 2^i u_i, u_i \in \{0, 1\} \qquad (57)$$

By the foregoing representation set forth in Equation (57), one may now assume that the bilinear term xy containing y is a binary variable and, thus, x∈[$\underline{x}$,$\bar{x}$]. Then the term xy is substituted by x. The following linear constraint is formulated:

$$\bar{x}y \leq x \leq \bar{x}y. \qquad (58)$$

Using Equations (56), (57), and (58), one can reformulate the problem of Equations (40)-(55) as a 0-1 mixed-integer linear program, which is relatively easy to be solved by a standard MILP solver. For purposes of illustration, the IBM ILOG CPLEX Optimizer program has been ujsed to solve this problem as described in greater detail hereinafter.

Figure 5:
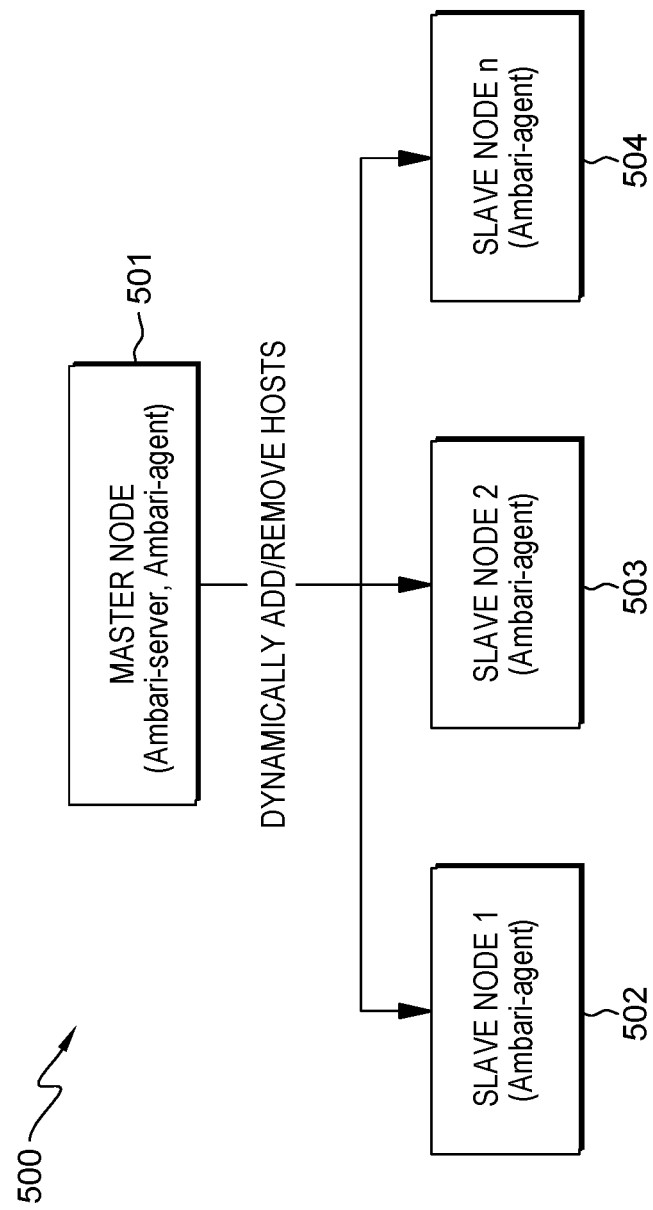
FIG. 5 is a block diagram showing an illustrative cluster of nodes on which the procedure of FIG. 1 may be performed.

FIG. 5 is a block diagram showing an illustrative cluster of nodes 500 on which the procedure of FIG. 1 may be performed according to a set of exemplary embodiments described herein.

Cloud computing cluster provision: For purposes of illustration, a HDP (Hortonworks Data Platform) may be utilized for dynamic cluster provision to adapt to the requirements of one or more applications on computing resources. As shown in FIG. 5, an Ambari-server is installed on a Master Node 501 which can communicate with any of a plurality of Slave Nodes such as a Slave Node 1 502, a Slave Node 2 503, and a Slave Node n 504, once these Slave Nodes are installed using an Ambari-agent. The dynamic provision of the cluster of nodes 500 is controlled by adding domain names into the cluster, and/or by removing domain names from the cluster. A tool may be written to automatically set the domain names and perform necessary security configurations on all the nodes in the cluster of nodes 500. Then, the Ambari-server is installed on the Master Node 501 and the Ambari-agent is installed on all of the additional nodes in the cluster including Slave Node 1 502, Slave Node 2 503, and Slave Node n 504. With the configuration set by users, the tool is configured for automatically setting up the cluster for cloud computing.

According to a set of further embodiments, the exemplary configuration of FIG. 5 may be adopted to construct a ten-node cluster. For purposes of illustration, this cluster may be used to compare the performance tuning model of FIG. 1 with a baseline method. The baseline method may comprise Hadoop™ MapReduce using default parameters. The ten nodes in the cluster may be substantially identical, where a first node comprises Master Node 501, and nine additional Slave Nodes are used for computation. Three of the nine Slave Nodes are shown as Slave Node 1 502, Slave Node 2 503, and Slave Node n 504. For purposes of illustration, the Master Node 501 and each Slave Node 502, 503, and 504 may contain an Intel(R) Xeon(R) CPU@3.5 GHz with 4 cores, 8 GB RAM@1600 MHz, and a 500 GB hard disk. The network communication speed can be up to 1000 Mbps.

Benchmark methods and datasets: For purposes of illustration, several benchmark methods and datasets are presented to demonstrate the operational sequence of FIG. 1. As shown in Table 2, terasort, word count, word mean, word median, word standard deviation, and text search (grep) are considered as benchmark methods. For purposes of comparison, all of these benchmark methods may be executed with an as-delivered version of Hadoop™ software. Two illustrative datasets, i.e., Freebase and Wikipedia, may be used for evaluation. The input datasize is set to be 100 GB.

TABLE 2

Benchmark methods and input data sets used for performance evaluation.

| Benchmark Method | Data Set | Data Size |
|---|---|---|
| terasort | generate using teragen | 100 GB |
| word count | freebase and wikipedia | 100 GB |
| word mean | freebase and wikipedia | 100 GB |
| word median | freebase and wikipedia | 100 GB |
| word std dev. | freebase and wikipedia | 100 GB |
| text search | freebase and wikipedia | 100 GB |

TABLE 3

Parameter setting for the optimization model.

| Parameter | Value | Parameter | Value | Parameter | Value |
|---|---|---|---|---|---|
| $d_{mread1}$ | 5 | $d_{mread2}$ | 2 | $d_{mexe}$ | 1 |
| $d_{mspill1}$ | 15 | $d_{mspill2}$ | 5 | $d_{mspill3}$ | 1 |
| $d_{rread}$ | 15 | $d_{rsibuf1}$ | 15 | $d_{rsibuf2}$ | 5 |
| $d_{rsmerge1}$ | 15 | $d_{rsmerge2}$ | 5 | $d_{rsmerge3}$ | 1 |
| $d_{ribuf1}$ | 15 | $d_{ribuf2}$ | 5 | $d_{rwrite1}$ | 10 |
| $d_{rwrite2}$ | 3 | $d_{mo}$ | 1 | $d_{ro}$ | 1 |
| c | 0 | $\beta_1$ | 1 | $\omega_1$ | 50 |
| $\beta_2$ | 0.9 | $\omega_2$ | 10 | $\beta_3$ | 1 |
| $\omega_3$ | 0 | | | | |

TABLE 4

Optimized and default Hadoop parameter values.

| Hadoop Parameter | Optimized Value | Default Value |
|---|---|---|
| yarn.nodemanager.resource.memory-mb | 6144M | 6144M |
| dfs.blocksize | 400M | 128M |
| mapreduce.job.maps | 256 | 2 |
| mapreduce.map.memory.mb | 1024M | 1024M |
| mapreduce.job.reduces | 256 | 1 |
| mapreduce.reduce.memory.mb | 1024M | 1024M |
| mapreduce.task.io.sort.factor | 100 | 10 |
| mapreduce.task.io.sort.mb | 600M | 100M |
| mapreduce.map.sort.spill.percent | 0.90 | 0.80 |
| mapreduce.reduce.shuffle.parallelcopies | 100 | 5 |
| mapreduce.reduce.shuffle.input.buffer.percent | 0.85 | 0.70 |
| mapreduce.reduce.shuffle.memory.limit.percent | 0.25 | 0.25 |
| mapreduce.reduce.shuffle.merge.percent | 0.82 | 0.66 |
| mapreduce.reduce.input.buffer.percent | 1.0 | 0.0 |

To illustrate the operational sequence of FIG. 1, the benchmark methods on the cluster are executed for ten times and the resulting performance is reported. This comparison is performed between the optimized parameters and the default Hadoop™ parameters.

Time consumption comparison: As shown in Table 3, values for the optimization model parameters are set in accordance with FIG. 1. Using this approach, an optimized set of parameters for Hadoop™ are achieved, as is shown in Table 4.

Figure 6:
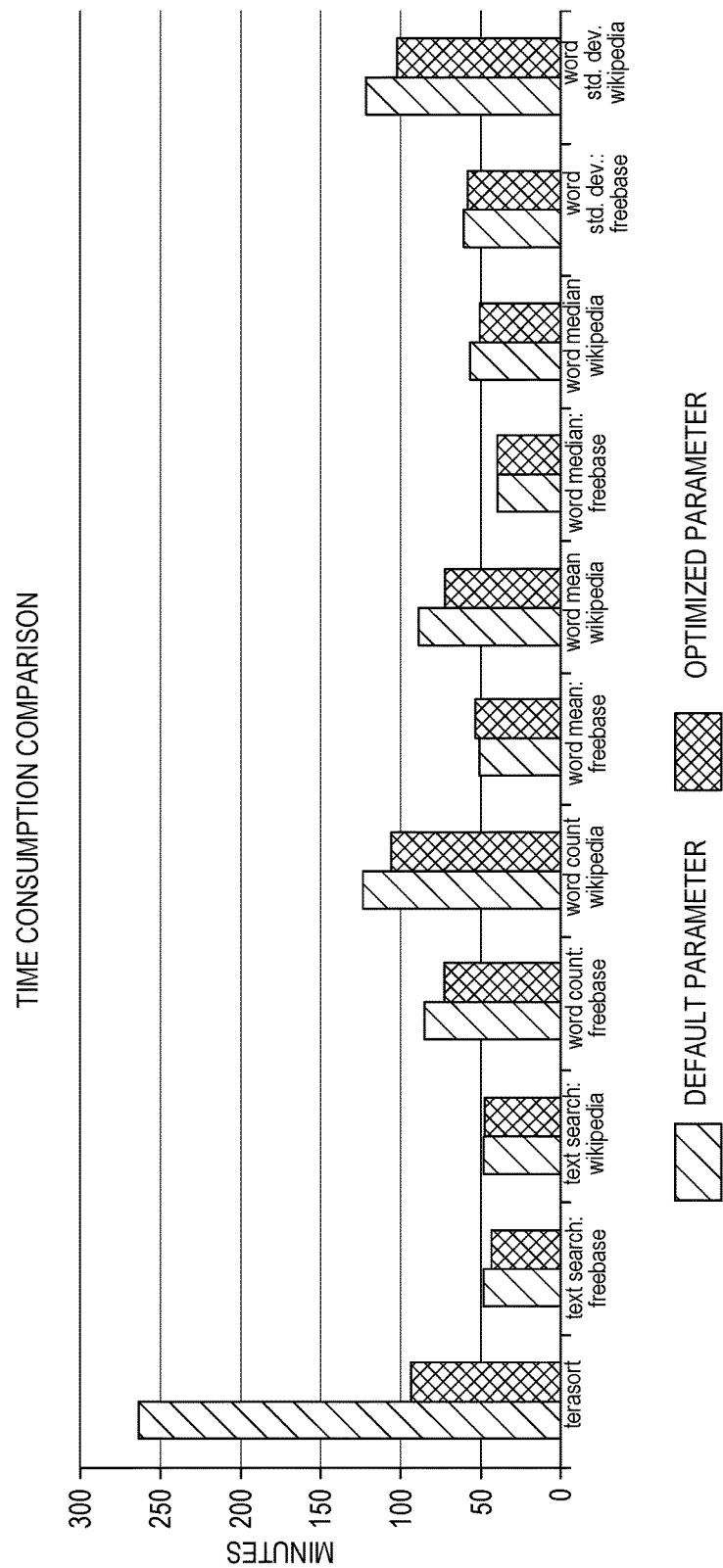
FIG. 6 is a bar graph comparing time consumption using default parameters with time consumption using parameters that have been optimized in accordance with the method of FIG. 1.

FIG. 6 is a bar graph comparing time consumption using default parameters with time consumption using parameters that have been optimized in accordance with the method of FIG. 1. FIG. 6 reveals that the method of FIG. 1 improves performance significantly compared to the default Hadoop™ parameter settings for terasort. The method of FIG. 1 also achieves a significant improvement in time consumption for running word mean on a Wikipedia dataset (i.e., word mean: Wikipedia). For example, in some embodiments, with respect to running word count on Freebase, word count running on Wikipedia, or word mean running on Wikipedia, the optimization model of FIG. 1 can save more than 15% time. When running text search on Freebase, using the optimized parameters can results in about 12% improvement in running time over the default parameters. A slight performance increase is gained with respect to the text search running on Wikipedia and word standard deviation running on Freebase. The method of FIG. 1 can achieve comparable performance with the default Hadoop™ parameters when running word mean on Freebase and running word median on Freebase.

Impact of $S_m$ and $S_{mr}$:

According to a set of further embodiments disclosed herein, two key parameters, the sort memory and spill percent, are inspected to check their impacts on MapReduce job execution. Sort memory is changed from 100 M to be 700 M and change spill percent from 0.2 to 0.9, while fixing other parameters as the optimized value Terasort is used as the benchmark for evaluation and the average running time is reported in Table 5.

TABLE 5

Impact of $S_m$ and $S_{mr}$ measured with time consumption in minutes.

| $S_m$ | 100M | 200M | 300M | 400M | 500M | 600M | 700M |
|---|---|---|---|---|---|---|---|
| 0.2 | 12.43 | 13.55 | 12.74 | 12.07 | 13.95 | 16.65 | 17.94 |
| 0.3 | 13.12 | 12.59 | 13.02 | 14.13 | 15.32 | 14.56 | 15.73 |
| 0.4 | 13.50 | 12.75 | 14.86 | 12.87 | 13.45 | 15.51 | 15.73 |
| 0.5 | 12.37 | 13.41 | 12.98 | 13.45 | 12.59 | 14.15 | 15.64 |
| 0.6 | 13.17 | 12.13 | 14.61 | 12.63 | 13.68 | 14.61 | 14.59 |
| 0.7 | 14.00 | 13.95 | 12.84 | 14.79 | 14.27 | 14.82 | 10.76 |
| 0.8 | 12.95 | 13.21 | 12.89 | 13.41 | 13.31 | 09.81 | 09.48 |
| 0.9 | 12.65 | 13.58 | 12.23 | 12.23 | 09.77 | 09.36 | 10.34 |

In some implementations, when the sort memory is not greater than 400 M, performance may be poor due to excessive spilling on the disk. When setting sort memory to be 500 M, an optimized running time may be achieved by setting spill percent to be 0.9. However, spill still causes unnecessary overhead since increasing the sort memory from 500 M to be 600 M could reduce time consumption by more than 4%. In some implementations, setting sort memory to be 700 M wastes the memory, resulting in somewhat suboptimal performance.

Figure 7:
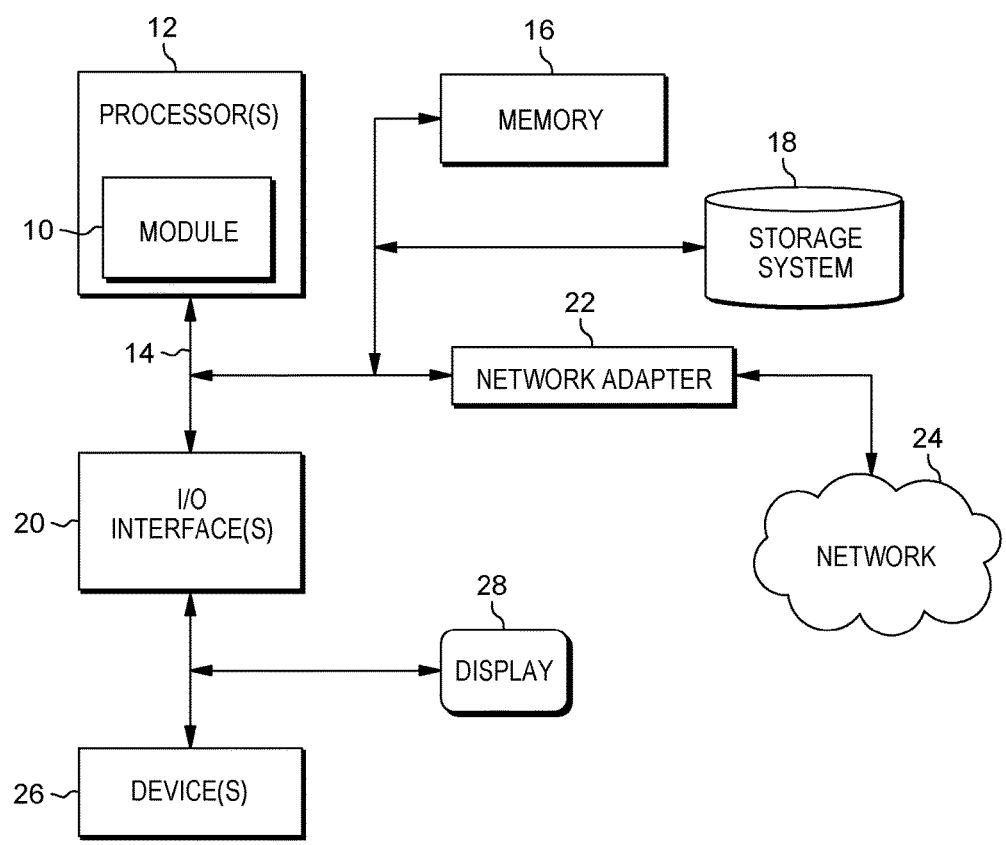
FIG. 7 is a schematic of an exemplary computer or processing system that may implement the method of FIG. 1.

FIG. 7 illustrates a schematic of an exemplary computer or processing system that may implement the method of FIG. 1 for automatically determining values for a plurality of Map Reduce parameters, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving functionality of a computer system comprising a cluster of nodes, the method comprising:
    selecting a first trial design setup for the cluster of nodes, wherein the first trial design setup comprises a determination of a respective set of computing resources to be provided on each of a plurality of nodes of the cluster of nodes;
    identifying a plurality of parameters that affect the cluster of nodes performing a Map Reduce job;
    determining a relationship between each of the identified parameters and a maximization of resource utilization for the cluster of nodes;
    representing a workflow for the Map Reduce job based upon one or more supply-demand relationships among the cluster of nodes;
    modeling an execution cost for the Map Reduce job as a function of the plurality of identified parameters and determining the execution cost using a mapper cost function comprising:

$$TF_{mapper} = f_{tfm}(T_{mapper}, T_{cfm}, M_{cost}) @ \left\lceil \frac{T_{mapper}}{N_n \times T_{cfm}} \right\rceil \times M_{cost}$$

wherein $T_{mapper}$ is a total number of mappers, $T_{cfm}$ is a total number of containers for a mapper in a node, $M_{cost}$ is a default cost incurred by the mapper, $TF_{mapper}$ is a mapper cost, and $N_n$ is a number of nodes;
formulating a mixed-integer non-linear programming problem to minimize the execution cost for the Map Reduce job;
reformulating the mixed-integer non-linear programming problem as a mixed-integer linear programming problem;
solving the mixed-integer linear programming problem to determine a combination of parameter values for the plurality of identified parameters that minimizes the execution cost for the Map Reduce job;
configuring the cluster of nodes into the first trial design setup using the determined combination of parameter values;
determining a first performance result number for the first trial design setup; and
configuring the cluster of nodes into a second trial design setup when the first performance result number is not acceptable; otherwise, using the first trial design setup as a final design setup.

2. The method of claim 1 further comprising determining the combination of parameter values once for the cluster of nodes, and then applying the combination of parameter values to one or more subsequent Map Reduce jobs that are executed by the cluster of nodes.

3. The method of claim 1 wherein the mixed-integer linear programming problem comprises a 0-1 mixed-integer linear programming problem.

4. The method of claim 1 further comprising:
    performing the identifying, determining, representing, modeling, formulating, and reformulating to determine the second trial design setup;
    determining a second performance result number for the second trial design setup;
    determining whether or not the second performance result number is acceptable; and
    choosing the second trial design setup as the final design setup when the second performance result number is acceptable.

5. The method of claim 4 further comprising providing a set of menu options that includes a plurality of trial design setups.

6. The method of claim 1 further comprising determining the execution cost using a reducer cost function comprising:

$$TF_{reducer} = f_{tfr}(T_{reducer}, T_{cfr}, R_{cost}) @ \left\lceil \frac{T_{reducer}}{N_n \times T_{cfr}} \right\rceil \times R_{cost}$$

wherein $T_{reducer}$ is a total number of reducers, $T_{cfr}$ is a total number of containers for a reducer in a node, $R_{cost}$ is a default cost incurred by the reducer, $TF_{reducer}$ is a reducer cost, and $N_n$ is a number of computing nodes.

7. An apparatus for improving functionality of a computer system comprising a cluster of nodes, the apparatus comprising a processor and a memory coupled to the processor, wherein the memory comprises instructions which, when executed by the processor, cause the processor to perform:

selecting a first trial design setup for the cluster of nodes, wherein the first trial design setup comprises a determination of a respective set of computing resources to be provided on each of a plurality of nodes of the cluster of nodes;

identifying a plurality of parameters that affect the cluster of nodes performing a Map Reduce job;

determining a relationship between each of the identified parameters and a maximization of resource utilization for the cluster of nodes;

representing a workflow for the Map Reduce job based upon one or more supply-demand relationships among the cluster of nodes;

modeling an execution cost for the Map Reduce job as a function of the plurality of identified parameters and determining the execution cost using a mapper cost function comprising:

$$TF_{mapper} = f_{tfm}(T_{mapper}, T_{cfm}, M_{cost}) @ \left\lceil \frac{T_{mapper}}{N_n \times T_{cif}} \right\rceil \times M_{cost}$$

wherein $T_{mapper}$ is a total number of mappers, $T_{cfm}$ is a total number of containers for a mapper in a node, $M_{cost}$ is a default cost incurred by the mapper, $TF_{mapper}$ is a mapper cost, and $N_n$ is a number of nodes;

formulating a mixed-integer non-linear programming problem to minimize the execution cost for the Map Reduce job;

reformulating the mixed-integer non-linear programming problem as a mixed-integer linear programming problem;

solving the mixed-integer linear programming problem to determine a combination of parameter values for the plurality of identified parameters that minimizes the execution cost for the Map Reduce job;

configuring the cluster of nodes into the first trial design setup using the determined combination of parameter values;

determining a first performance result number for the first trial design setup; and configuring the cluster of nodes into a second trial design setup when the first performance result number is not acceptable; otherwise, using the first trial design setup as a final design setup.

8. The apparatus of claim 7 further configured for determining the combination of parameter values once for the cluster of nodes, and then applying the combination of parameter values to one or more subsequent Map Reduce jobs that are executed by the cluster of nodes.

9. The apparatus of claim 7 wherein the mixed-integer linear programming problem comprises a 0-1 mixed integer linear programming problem.

10. The apparatus of claim 7 further configured for:

performing the identifying, determining, representing, modeling, formulating, and reformulating to determine the second trial design setup determining a second performance result number for the second trial design setup;

determining whether or not the second performance result number is acceptable; and choosing the second trial design setup as the final design setup when the second performance result number is acceptable.

11. The apparatus of claim 10 further configured for providing a set of menu options that includes a plurality of trial design setups.

12. The apparatus of claim 7 further configured for determining the execution cost using a reducer cost function comprising:

$$TF_{reducer} = f_{tfr}(T_{reducer}, T_{cfr}, R_{cost}) @ \left\lceil \frac{T_{reducer}}{N_n \times T_{cfm}} \right\rceil \times R_{cost}$$

wherein $T_{reducer}$ is a total number of reducers, $T_{cfr}$ is a total number of containers for a reducer in a node, $R_{cost}$ is a default cost incurred by the reducer, $TF_{reducer}$ is a reducer cost, and $N_n$ is a number of computing nodes.

13. A computer program product for improving functionality of a computer system comprising a plurality of nodes, the computer program product comprising a computer-readable storage medium having a computer-readable program stored therein, wherein the computer-readable program, when executed on a computer, causes the computer to perform:

selecting a first trial design setup for the cluster of nodes, wherein the first trial design setup comprises a determination of a respective set of computing resources to be provided on each of a plurality of nodes of the cluster of nodes;

identifying a plurality of parameters that affect the cluster of nodes performing a Map Reduce job;

determining a relationship between each of the identified parameters and a maximization of resource utilization for the cluster of nodes;

representing a workflow for the Map Reduce job based upon one or more supply-demand relationships among the cluster of nodes;

modeling an execution cost for the Map Reduce job as a function of the plurality of identified parameters and determining the execution cost using a mapper cost function comprising:

$$TF_{mapper} = f_{tfm}(T_{mapper}, T_{cfm}, M_{cost}) @ \left\lceil \frac{T_{mapper}}{N_n \times T_{cfm}} \right\rceil \times M_{cost}$$

wherein $T_{mapper}$ is a total number of mappers, $T_{cfm}$ is a total number of containers for a mapper in a node, $M_{cost}$ is a default cost incurred by the mapper, $TF_{mapper}$ is a mapper cost, and $N_n$ is a number of nodes;

formulating a mixed-integer non-linear programming problem to minimize the execution cost for the Map Reduce job;

reformulating the mixed-integer non-linear programming problem as a mixed-integer linear programming problem;

solving the mixed-integer linear programming problem to determine a combination of parameter values for the plurality of identified parameters that minimizes the execution cost for the Map Reduce job;

configuring the cluster of nodes into the first trial design setup using the determined combination of parameter values;

determining a first performance result number for the first trial design setup; and configuring the cluster of nodes into a second trial design setup when the first performance result number is not acceptable; otherwise, using the first trial design setup as a final design setup.

14. The computer program product of claim 13 wherein the computer-readable program further includes instructions for determining the combination of parameter values once for the cluster of nodes, and then applying the combination of parameter values to one or more subsequent Map Reduce jobs that are executed by the cluster of nodes.

15. The computer program product of claim 13 wherein the mixed-integer linear programming problem comprises a 0-1 mixed-integer linear programming problem.

16. The computer program product of claim 13 further including instructions for:
performing the identifying, determining, representing, modeling, formulating, and reformulating to determine the second trial design setup;
determining a second performance result number for the second trial design setup;
determining whether or not the second performance result number is acceptable; and
choosing the second trial design setup as the final design setup when the second performance result number is acceptable.

17. The computer program product of claim 16 further configured for providing a set of menu options that includes a plurality of trial design setups.

18. The computer program product of claim 13 further configured for determining the execution cost using a reducer cost function comprising:

$$TF_{reducer} = f_{tfr}(T_{reducer}, T_{cfr}, R_{cost}) @ \left\lceil \frac{T_{reducer}}{N_n \times T_{cfr}} \right\rceil \times R_{cost}$$

wherein $T_{reducer}$ is a total number of reducers, $T_{cfr}$ is a total number of containers for a reducer in a node, $R_{cost}$ is a default cost incurred by the reducer, $TF_{reducer}$ is a reducer cost, and $N_n$ is a number of computing nodes.

* * * * *